J. J. CALLOW.
Method of Spacing and Lettering Signs.
No. 229,952.                          Patented July 13, 1880.
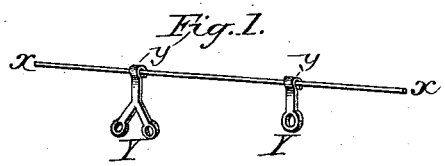
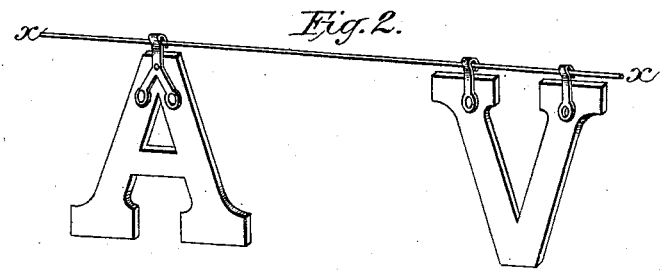
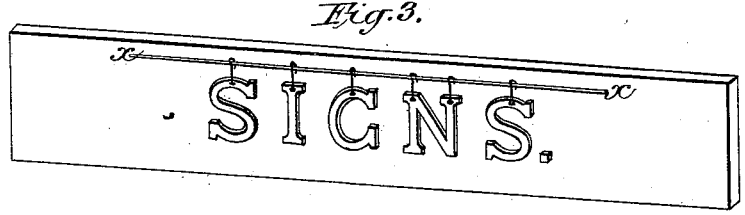
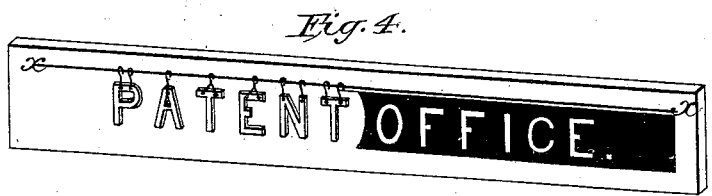
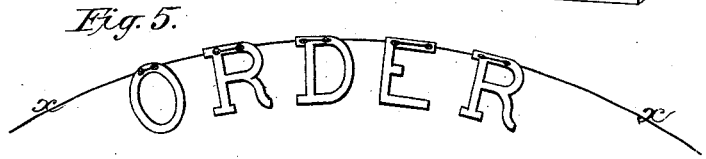
Witnesses:
Thomas Evans
J. Deucher
Inventor:
J. J. Callow

UNITED STATES PATENT OFFICE.

JOHN J. CALLOW, OF CLEVELAND, OHIO.

METHOD OF SPACING AND LETTERING SIGNS.

SPECIFICATION forming part of Letters Patent No. 229,952, dated July 13, 1880.

Application filed November 10, 1879.

*To all whom it may concern:*

Be it known that I, JOHN J. CALLOW, of Cleveland, in the county of Cuyahoga and State of Ohio, have invented certain Improvements in Methods of Spacing and Lettering Signs, of which the following is a specification.

My invention consists of a new method of spacing and outlining the lettering for signs.

Figure 1 shows the hooks $y$, having eyelet-holes Y, which eyelet-holes are used to pass the spacing-wire $x$ through to form curves when the letters are required in a circle, as shown at Fig. 5. Fig. 2 shows a plan of two letters, A and V, having the said hooks securely fastened thereto by means of the eyelets, and suspended on the spacing wire or cord $x$. Fig. 3 is a view of a sign-board with the card letters forming the word "Signs" already spaced in an accurate and true position on the spacing wire or cord, and embodying my invention. Fig. 4 is a plan somewhat similar to Fig. 3, but showing the words "Patent Office," the word "Office" being already painted or filled in around the letters with the ground color and the letters taken off as done one by one and laid aside for another occasion. Fig. 5 shows the card letters arranged to form the word "Order," suspended on the spacing-wire $x$ through the eyelet-holes instead of on the hooks, so as to form a true curve and yet have all the letters and spaces in their respective places.

The general advantages of these improvements are, that the spacing of letters in sign-work can be easily and rapidly executed by unskilled persons with all the facility of practical sign-painters, and letters or other forms can be quickly traced round their edges with pencil preparatory to filling in with paint, the principal and important part of sign-painting being the proper spacing of the letters, and this is accurately accomplished by means of the spacing wire or cord $x$.

Having thus described my invention, I claim as new and desire to secure by Letters Patent—

The method above set forth of spacing and outlining the lettering for signs or similar devices preparatory to painting, viz: stretching and arranging a cord or wire at the proper point and attaching thereto suitable letters for such sign or device, constructed and adapted for such attachment or use, and properly adjusting, spacing, and outlining the same, substantially as described.

JOHN J. CALLOW.

Witnesses:
  JNO. T. SULLIVAN,
  E. E. HUGGINS.